United States Patent
Fu et al.

(10) Patent No.: US 9,015,314 B2
(45) Date of Patent: Apr. 21, 2015

(54) ROUTE CONTROL METHOD AND SYSTEM, AND ROUTE COMPUTING APPARATUS

(75) Inventors: Xihua Fu, Shenzhen (CN); Xinling Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 256 days.

(21) Appl. No.: 13/876,491

(22) PCT Filed: Sep. 30, 2011

(86) PCT No.: PCT/CN2011/080444
§ 371 (c)(1),
(2), (4) Date: Apr. 24, 2013

(87) PCT Pub. No.: WO2012/041251
PCT Pub. Date: Apr. 5, 2012

(65) Prior Publication Data
US 2013/0212268 A1    Aug. 15, 2013

(30) Foreign Application Priority Data
Sep. 30, 2010    (CN) .......................... 2010 1 0508500

(51) Int. Cl.
*G06F 15/173*    (2006.01)
*H04L 12/26*    (2006.01)
*H04L 12/721*    (2013.01)
*H04L 12/727*    (2013.01)

(52) U.S. Cl.
CPC .......... *H04L 43/0876* (2013.01); *H04L 45/123* (2013.01); *H04L 45/121* (2013.01)

(58) Field of Classification Search
CPC ...... H04L 45/302; H04L 45/48; H04L 45/121

USPC .......................................................... 709/224
See application file for complete search history.

(56) References Cited

U.S. PATENT DOCUMENTS

2004/0264372 A1*  12/2004  Huang .......................... 370/230
2009/0168775 A1*   7/2009  Lin et al. ...................... 370/390

FOREIGN PATENT DOCUMENTS

| CN | 101159695 A | 4/2008 |
| CN | 101616055 A | 12/2009 |
| JP | 2003060705 A | 2/2003 |
| KR | 20010058231 A | 7/2001 |

OTHER PUBLICATIONS

International Search Report for PCT/CN2011/080444 dated Dec. 20, 2011.

* cited by examiner

*Primary Examiner* — Adnan Mirza
(74) *Attorney, Agent, or Firm* — Ling Wu; Stephen Yang; Ling and Yang Intellectual Property

(57) ABSTRACT

A route control method is disclosed in the present document. The method includes: a path computing apparatus acquiring a latency value of each node and a latency value of a link between each node and each adjacent node thereof; and when receiving a route computing request, according to each latency value acquired, the path computing apparatus computing an end-to-end path satisfying a latency requirement of a service corresponding to the route computing request. A path computing apparatus and a route control system are also disclosed in the present document. With the present document, a route control computed by the latency provides a solution for a latency Service Level Agreement (SLA) of operators.

19 Claims, 1 Drawing Sheet

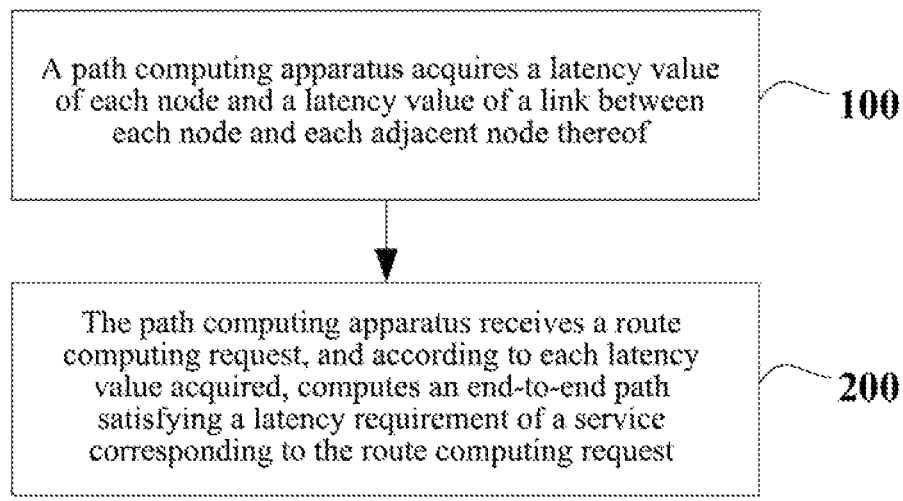

ROUTE CONTROL METHOD AND SYSTEM, AND ROUTE COMPUTING APPARATUS

TECHNICAL FIELD

The present document relates to the filed of packet transport network and optical transmission network, and particularly, to a route control method and system, and a route computing apparatus.

BACKGROUND OF THE RELATED ART

The International Telecommunication Union Telecommunication Standardization Sector (ITU-T) existing standards, such as G.8021 and Y.1731, provide latency measurement mechanisms of a transport plane for an Ethernet, and with the mechanisms provided by theses standards, delay values of data frames of the Ethernet which are transmitted in links between two Ethernet devices can be measured. As defined in the G.8051, in order to achieve the object of performance monitoring, an active frame delay measurement needs to collect static statistical data, including a minimum Frame Delay (FD) value, an average FD value, a maximum FD value, a minimum Frame Delay Variation (FDV) value, an average FDV value and a maximum FDV value, and measured values based on each FD value and FDV value are generally collected every other 15 minutes and 24 hours:

Minimum frame delay value and minimum frame delay variation value;

Average frame delay value and average frame delay variation value;

Maximum frame delay value and maximum frame delay variation value.

On the other hand, in order to achieve the object of maintenance and diagnosis, a latency measurement as required needs to collect certain detailed measured values, and snapshots of the FD and FDV measurement results are collected according to required time intervals (such as 5 minutes or 1 hour).

With respect to an Optical Transmission Network (OTN), the ITU-T existing standard G.709 defines the relevant overhead bytes and latency measurement mechanisms, and with the mechanisms provided by these standards, latency values which occur when signals are transmitted in links between two OTN nodes can be measured. The G.709 adds Path Monitoring (PM)&Tandem Connection Monitoring (TCM) into an overhead byte of an Optical Data Unit (ODU)k, and Path Latency Measurement fields are contained and used for transferring flag bits where the latency measurement starts. The latency measurement can be initiated by a network management or a control plane; a management plane and the control plane also can configure an active measurement way, in which a latency measurement is initiated automatically once every 15 minutes or 24 hours.

A network element performing a latency measurement inserts a Latency Measurement (LMp) flag bit into the overhead byte of the ODUk, and measures the time returning from a "Latency Loopback" network element. When detecting the LMp flag bit, the "Latency Loopback" network element checks the overhead byte of the ODUk, and returns a signal to a "Latency Measurement" network element. A network element initiating the latency measurement must continually check DMp bits received. The "Latency Loopback" network element of the latency measurement must return a latency measurement packet to the network element initiating the latency measurement within a scope of 100 microseconds. The latency measurement must provide an active measurement (every 15 minutes or 24 hours once) or a measurement as required (there is no strict restriction on the time interval). Lengths of two unidirectional ODUk paths in a transmitting direction and a receiving direction may be different, thus the latency of one way is not half of the total latency.

When an Internet Protocol (IP)/Multi-Protocol Label Switching (MPLS) network operates and maintains in a bottom layer circuit switching network (such as a Synchronous Digital Hierarchy (SDH) ring network), a change of the latency in the bottom layer network (due to an action of the network maintenance or an occurrence of a breakdown) cannot be known by the MPLS network. This will cause that the latency influences terminal users, and sometimes a service level agreement subscribed with the clients will be also violated, which leads to user complaints. An alternative solution is to configure the IP/MPLS network in an unprotected circuit switching network and set weights of the links according to latency requirements. This will cause that traffics are oriented to a path with the minimum latency, but actually these paths are not required to satisfy one Service Level Agreement (SLA), and the SLA required by the users may have no need of meeting such a high requirement, thus leading to a reduced flexibility and increased costs. By using the recovering and grooming of the bottom layer network, efficiency can be enhanced, but notifying the IP/MPLS network of performance parameters is not applicable at present. For example, the performance parameters such as the latency and so on are notified to the IP/MPLS network, and thus before the protection and recovering, influence of these parameters on the protection and recovering can be considered.

Signaling protocol message contains Label Switched Path (LSP) parameter information (such as bandwidth, priority establishment and maintenance, and latency and so on). When it is required to allocate an LSP to a member link of complex links, it needs to consider these parameters. When the latency of the member link is changed, it is required to timely notify a client layer. In order to support the latency SLF and provide an operation and maintenance way which can be accepted by the users, the solution should regulate a protocol, which permits the service layer network to notify a top layer client network thereof of the latency.

When the traffics are switched from the current member link to another member link with a different latency, if the latency of a target member link is less than the latency of an original member link, reordering will be performed on the traffics; and when the latency of the target member link is greater than the latency of the original member link, clumping will be performed on the traffics. Therefore, for certain traffics hypersensitive to the influence of latency changes (such as clock synchronization distribution and pseudo wire circuit simulation), it is required to purposely describe the latency requirements in the SLA.

The solution should provide a way, in which that one traffic is indicated to select a member link with an acceptable maximum latency value through the protocol, and meanwhile, one traffic is indicated to select a member link with an acceptable minimum latency value through the protocol.

An unprotected LSP can satisfy SLA requirements of the latency through manual configurations, but this will cause an extremely low usability for optional routes satisfying the SLA requirements of the latency cannot be determined.

Currently, many operators propose network latency test requirements, requiring to provide latency measurements for circuits of the clients in a Dense Wavelength Division Multiplexing (DWDM) transfer system. When network latency measurements are provided for corporate clients who have very high requirements on the latency and for services penetrating optical networks (such as financial affairs and storage services), different latencies can be allocated according to an SLA level. Latency measurement results must be accurate enough to support the SLA, that is, the actual latency must be accurate, and otherwise the services promised to the clients cannot be implemented. However, in the current operation and maintenance mode of the latency measurements, whether latency values of the entire path satisfy the latency requirements of the clients is detected by sending test signals only after determining service routes of the clients, i.e. determining a path in which signals are transmitted. If the latency values do not satisfy the requirements of the clients, it also needs to refind other available routes and perform latency measurement again, and such an operation and maintenance mode has high costs and is extremely time-consuming.

Latency link performance weight information becomes a key demand of the operators, especially with respect to the OTN network, for example, in an overlength transmission system of 100 G, when certain private line services (e.g. an Ethernet Private Line (EPL)) pass through the OTN network, with regard to applications using mirror data based stocks, futures trading and data centers, a subtle latency can influence the trades. Therefore, for those highly value-added clients, the latency and the latency SLF are a key measure for selecting service operators of private line services. Certainly, the lower the latency is, the stronger the competitiveness of the operators in the private line services is, but how to guarantee that the latency after actually opening the services is identical with the latency promised to the clients will also influence the competitiveness of the private line services.

SUMMARY OF THE INVENTION

The technical problem required to be solved by the present document is to provide a route control method and system, and a route computing apparatus with respect to a routing control computed by the latency in a packet transport network and an optical transmission network.

In order to solve the above problem, the present document discloses a route control method, which comprises:

a path computing apparatus acquiring a latency value of each node and a latency value of a link between each node and each adjacent node thereof; and when receiving a route computing request, according to each latency value acquired, the path computing apparatus computing an end-to-end path satisfying a latency requirement of a service corresponding to the route computing request.

In the method of the present document, the step of a path computing apparatus acquiring a latency value of a link between each node and each adjacent node thereof comprises:

a control plane receiving the latency value of the link between each node and each adjacent node thereof reported by each node, and releasing the latency value to the path computing apparatus or a routing domain through a routing protocol.

In the method of the present document, the step of a path computing apparatus acquiring a latency value of each node comprises:

each node acquiring a latency value of the node itself and reporting the latency value to a control plane, the control plane releasing the latency value of the node reported by each node to the path computing apparatus or a routing domain through a routing protocol; or each node acquiring a latency value of the node itself and reporting the latency value to a control plane, the control plane accumulating ½ of the latency value of the node reported by each node to latency values of all links connected to the node respectively, and releasing the latency values of all the links to the path computing apparatus or a routing domain through a routing protocol.

In the method of the present document, the latency value of each node is an average value of all latency values from ingress interfaces to egress interfaces on nodes.

In the method of the present document, the step of the control plane releasing the latency value of the node reported by each node to the path computing apparatus or a routing domain through a routing protocol comprises:

the control plane taking the latency value reported by each node as attribute information of a traffic engineering link, and releasing the attribute information of the traffic engineering link to the path computing apparatus or the routing domain.

In the method of the present document, the step of each node reporting the latency value of the link between the node itself and each adjacent node thereof to the control plane comprises:

each node measuring the latency value of the link between the node itself and each adjacent node thereof, when it is a first time for the node itself to perform latency measurement, directly reporting a measured latency value to the control plane, and when it is not the first time for the node itself to perform latency measurement, judging whether a measured latency value of this time is identical with a measured latency value of last time, only when the measured latency value of this time is different from the measured latency value of last time and exceeds a threshold value set by a user, reporting the measured latency value of this time to the control plane.

The method of the present document further comprises:

after the path computing apparatus computes the end-to-end path satisfying the latency requirement of the service corresponding to the route computing request, a source node of the end-to-end path sending path message to a sink node of the end-to-end path, the sink node collecting latency values of all nodes passed by the path message and latency values of links between all adjacent nodes passed by the path message, and accumulating collected latency values to obtain a first total latency value, when determining that the first total latency value satisfies the latency requirement of the service corresponding to the route computing request, the sink node returning reservation message to an upstream node, and when determining that the first total latency value does not satisfy the latency requirement of the service corresponding to the route computing request, the sink node returning path error message to the upstream node.

The method of the present document further comprises:

when the sink node returns the reservation message, the source node collecting latency values of all nodes passed by the reservation message and latency values of links between all adjacent nodes passed by the reservation message, and accumulating collected latency values to obtain a second total latency value, and when determining that the second total latency value does not satisfy the latency requirement of the service corresponding to the route computing request, the source node indicating a connection establishment failure to a client.

In the method of the present document, the latency values contain real-time latency values and latency variation values; and traffic engineering parameters of the path message and reservation message carry information of the latency requirement of the service corresponding to the route computing request; and the information of the latency requirement comprises a latency required by the client; or the information of the latency requirement comprises an acceptable maximum latency value and an acceptable maximum latency variation value required by the client, wherein, a selection policy of the latency requirement is to: satisfy only the acceptable maximum latency value; satisfy only the acceptable maximum latency variation value; satisfy the acceptable maximum latency variation value and the acceptable maximum latency value simultaneously; or need not to satisfy the acceptable maximum latency variation value and the acceptable maximum latency value.

In the method of the present document, in the step of accumulating the latency values of all nodes passed by the path message or the reservation message and the latency values of links between all adjacent nodes passed by the path message or the reservation message, the path message and the reservation message carry a latency accumulation object, the latency accumulation object contains two subobjects, wherein a first subobject is used for accumulating latency values of all links and latency values of nodes in a direction from the source node to the sink node, and a second subobject is used for accumulating latency values of all links and latency values of nodes in a direction from the sink node to the source node.

The method of the present document further comprises:

when the end-to-end path is required to cross at least one service layer network, in a signaling for establishing a Label Switching Path (LSP) in a top layer, in an subobject of a pair of border nodes when carrying parameter information for establishing a service layer Forwarding Adjacency LSP (FA-LSP), carrying a latency requirement of a service layer FA-LSP taking a pair of border nodes as a source node and a sink node; and the border nodes calculating a service layer FA-LSP route satisfying the latency requirement according to the latency requirement.

The method of the present document further comprises:

when a total latency value of the entire FA-LSP of the service layer FA-LSP is changed, notifying a client layer using the FA-LSP of a changed total latency value.

In the method of the present document, the step of notifying a client layer using the FA-LSP of a changed total latency value comprises: the source node of the FA-LSP or the sink node of the FA-LSP notifying a node of a client layer LSP connected to the source node of the FA-LSP or the sink node of the FA-LSP of the changed total latency value of the FA-LSP through signaling protocol message.

The method of the present document further comprises:

if the FA-LSP forms an FA with a routing adjacency relation at the client layer, taking the changed total latency value of the FA-LSP as a value of a traffic engineering attribute of the FA, and releasing the value of the traffic engineering attribute of the FA to a routing domain or a path computing apparatus of the client layer.

In order to solve the above problem, the present document provides a path computing apparatus, which comprises:

an acquisition module, configured to: acquire a latency value of each node and a latency value of a link between each node and each adjacent node thereof; and a computation module, configured to: when receiving a route computing request, according to each latency value acquired by the acquisition module, compute an end-to-end path satisfying a latency requirement of a service corresponding to the route computing request.

In the examples of the present document, a routing control computed by the latency provides a solution for latency SLA of operators.

BRIEF DESCRIPTION OF DRAWINGS

FIG. 1 is a flow diagram of the method in the example 1.

PREFERRED EMBODIMENTS OF THE PRESENT INVENTION

The technical scheme of the present document will be further described in detail in combination with the accompanying drawings and specific examples below. It should be noted that the examples in the present document and the characteristics in the examples can be optionally combined with each other in the condition of no conflict.

Example 1

The example provides a route control method, which can be used for a packet transport network or an optical transmission network, a specific process thereof is as shown in FIG. 1, and the following steps are included.

In step 100, a path computing apparatus acquires a latency value of each node and a latency value of a link between each node and each adjacent node thereof.

It should be noted that, in the application of the present document, the latency values can contain real-time latency values and latency variation values.

In the example, each node can start a latency measurement function to measure the latency value of the link between the node itself and each adjacent node thereof (i.e. a link directly formed by the node itself and the adjacent node without going through other nodes), and report latency measurement results to a control plane, and the control plane releases the latency value of the link between each node and each adjacent node thereof to the path computing apparatus or a routing domain. Therefore, the path computing apparatus can possess the latency values of all links in the whole network.

In another example, each node acquires a latency value of the node itself and reports the latency value to a control plane, the control plane accumulates ½ of the latency value of the node reported by each node to latency values of all links connected to the node respectively. The latency values of these links are sent to the path computing apparatus or a routing domain through a routing protocol. Therefore, the latency values of the links flooding through the routing protocol include the latency values of the links themselves and 0.5 times of the latency values of nodes themselves.

Furthermore, in certain preferred examples, a latency of the link between the node and its adjacent node can serve as weight information which influences the link performance, when latency measurement results of each node are different from the measurement historical data of the previous time, that is, only when the latency of the link between the node and its adjacent node is changed, it is required to report the latency to the control plane again so as to release the latency to the routing domain or the path computing apparatus again through the routing protocol. Specifically, each node measures the latency value of the link between the node itself and each adjacent node thereof, when it is the first time for the node itself to perform latency measurement, directly reports the measured latency value to the control plane, and when it is not the first time for the node itself to perform latency measurement, judges whether the measured latency value of this time is identical with a measured latency value of last time, only when the measured latency value of this time is different from the measured latency value of last time and exceeds a threshold value set by a user, reports the measured latency value of this time to the control plane, so as to make the control plane perform flooding again (that is, releasing the latency value of the link between each node and each adjacent node thereof to the path computing apparatus or the routing domain), thereby avoiding an unstable network due to frequent flooding.

Wherein, each node can perform latency measurement by means of actively measuring, for example, the latency measurement is initiated automatically every 15 minutes or 24 hours. The latency measurement also can be performed according to a configured time interval such as 5 minutes or 1 hour. The latency measurement also can be performed according to a received indication.

Moreover, when releasing the latency value of each node and the latency value of the link between each node and each adjacent node thereof to the routing domain or the path computing apparatus through the routing protocol, the control plane can take a latency value required to be released as one attribute information of a Traffic Engineering Link (TE Link) to release to the routing domain or the path computing apparatus.

In the example, in consideration of the differences between signal processing technologies of all nodes, for example, the statistical multiplexing (the packet network using the statistical multiplexing) technology or time division multiplexing (the optical transport network using the time division multiplexing) technology is used, thus the latency value is not a fixed value with regard to the same node. Moreover, with regard to the same node, the latency value also can have a relationship with the amount of the node bearer services, for example, in the condition that a node is in full load, with regard to the statistical multiplexing services, since the services are always scheduled by means of buffering and the priority in hardware implementation, latency values in different periods of each service passing through the node may be different. Therefore, a statistics for an average latency of the node with respect to all the services can be implemented, that is, it is an average value of all latency values from ingress interfaces to egress interfaces on the node. The average latency is configured by a management plane according to the capacity of equipment or is computed automatically after the node operates. That is, the control plane can know the average latency value of each node eventually, and then release an average latency value of a node on which the control plane is located to the routing domain or the path computing apparatus through the routing protocol.

In step 200, the path computing apparatus receives a route computing request, and according to each latency value acquired, computes an end-to-end path satisfying a latency requirement of a service corresponding to the route computing request.

In the example, the latency requirement of the service corresponding to the route computing request can be carried in the route computing request. Information of the latency requirement can include a latency required by the client (the latency required by the client can be a latency value and also can be a latency range); or it can include a minimum latency value, an average latency value, a maximum latency value and a selection policy of the latency requirement required by the client, wherein, the selection policy of the latency requirement is to make a prior selection to satisfy the minimum latency value, make a prior selection to satisfy the maximum latency value or make a prior selection to satisfy the average latency value; or the information of the latency requirement includes an acceptable maximum latency value and an acceptable maximum latency variation value required by the client, wherein, the selection policy of the latency requirement is to: satisfy only the acceptable maximum latency value; satisfy only the acceptable maximum latency variation value; satisfy the acceptable maximum latency variation value and the acceptable maximum latency value simultaneously; or need not to satisfy the acceptable maximum latency variation value and the acceptable maximum latency value.

According to the above step 200, after computing the end-to-end path satisfying the latency requirement of the service, a source node on the path can initiate a connection establishment process, wherein, a latency value required by the Label Switching Path (LSP) (i.e. the latency requirement of the service corresponding to the route computing request) can be carried in traffic engineering parameters of the signaling. When the source node on the path sends Path message to a sink node, the sink node can collect latencies of all nodes passed by the end-to-end service (i.e. the Path message) and latency values of links between all the adjacent nodes on the way passed by the end-to-end service and perform the accumulation, and after reaching the sink node, a total latency in a direction from the source node to the sink node (also can be called as a first total latency value) can be acquired through the accumulated value, the sink node can compare the first total latency value with the latency value carried in the traffic engineering parameters (i.e. the latency requirement of the service corresponding to the route computing request), if the first total latency value is greater than the latency value carried in the traffic engineering parameters, that is, if it does not satisfy the latency requirement of the service corresponding to the route computing request, the sink node returns PathErr message to the upstream and indicates a connection establishment failure; and if the first total latency value is less than or equal to the latency value carried in the traffic engineering parameters, that is, if it satisfies the latency requirement of the service corresponding to the route computing request, the sink node returns reservation (Resv) message to an upstream node.

When the sink node returns the Resv message to the source node, according to the same way, latencies of all nodes passed by the end-to-end service (i.e. the Resv message) and latency values of links between all the adjacent nodes passed by the end-to-end service can be collected, and accumulation can be performed, and after reaching the source node, a total latency in a direction from the sink node to the source node (also can be called as a second total latency value) can be acquired through the accumulated value. The source node can compare the second total latency value with the latency value carried in the traffic engineering parameters (i.e. the latency requirement of the service corresponding to the route computing request), and if the second total latency value is greater than the latency value carried in the traffic engineering parameters, the source node indicates a connection establishment failure to the client.

Wherein, the latency values of all nodes passed by the path message or the reservation message and the latency values of links between all the adjacent nodes passed by the path message or the reservation message can be collected in the following way:

the node receiving the path message or the reservation message, according to a latency value of the node itself and an associated latency value of a link between the node itself and its adjacent node, generating a node latency subobject and a link latency subobject, adding the generated node latency subobject and link latency subobject into an interface identifier subobject or a node identifier subobject of a record route object, and sending the path message including the record route object to a downstream node or sending the reservation message including the record route object to the upstream node.

In another example, the path message and the reservation message carry a latency accumulation object, the latency accumulation object contains two subobjects, wherein a first subobject is used for accumulating latency values of all links and latency values of nodes in a direction from the source node to the sink node, and a second subobject is used for accumulating latency values of all links and latency values of nodes in a direction from the sink node to the source node.

When the upstream node needs to send the path message to the downstream node, the upstream node is required to accumulate the latency values of the links to the first subobject of the latency accumulation object. When the downstream node needs to send the reservation message to the upstream node, the downstream node is required to accumulate the latency values of the links to the second subobject of the latency accumulation object.

When the end-to-end path is established according to above flow, if one LSP is required to cross one service layer network, signaling protocol message contains parameter information for establishing a service layer FA-LSP (such as the information of the latency requirement, including the minimum latency value, the maximum latency value, the average latency value and the latency selection policy, such as selecting an FA-LSP or a member link with the minimum latency and an FA-LSP or a member link with the maximum latency). The latency requirement values such as the minimum latency value, the maximum latency value and the average latency value of the service layer FA-LSP taking a pair of border nodes as the source node and the sink node can be carried in a signaling for establishing a top layer LSP. The border nodes calculate a service layer FA-LSP route satisfying the latency requirement according to a specified latency requirement value; or the information of the latency requirement includes the acceptable maximum latency value and the acceptable maximum latency variation value required by the client, wherein, the selection policy of the latency requirement is to: satisfy only the acceptable maximum latency value; satisfy only the acceptable maximum latency variation value; satisfy the acceptable maximum latency variation value and the acceptable maximum latency value simultaneously; or need not to satisfy the acceptable maximum latency variation value and the acceptable maximum latency value.

When the top layer LSP crosses one service layer Forwarding Adjacency LSP (FA-LSP), if the latency value (the minimum latency value, the maximum latency value or the average latency value) of any link between the adjacent nodes on the route passed by the service layer FA-LSP is changed, a total latency value of the entire FA-LSP is recalculated after a head node of the FA-LSP receives the traffic engineering link information after the latency value is changed, if the total latency value is changed, the changed total latency value is timely notified to a client layer using the FA-LSP, and a total latency value of the FA-LSP is used as a value of traffic engineering attribute latency of the FA.

The source node or the sink node of the FA-LSP can notify nodes of a client layer LSP connected to the source node or the sink node of the FA-LSP through a Generalized Multi-protocol Label Switching User-Network Interface (GMPLS UNI) of the changed total latency value of the FA-LSP through the signaling protocol message (such as Notify message or signaling refresh message). If the FA-LSP forms an FA with a routing adjacency relation at the client layer, the changed total latency value of the FA-LSP is taken as a value of a traffic engineering attribute (latency) of the FA and is released to the routing domain or the path computing apparatus of the client layer.

In the above flow, the control plane can release the latency value of each node and the latency value of the link between each node and each adjacent node thereof to the routing domain or the path computing apparatus through a routing protocol (such as OSPF-TE or IS-IS-TE). For example, a sub-TLV can be added in a Traffic Engineering Link (TE-Link) defined by the RFC4203 and named as "Link Latency", which is used for carrying the latency value of the link between the adjacent nodes. Meanwhile, the latency value of the node can be used as a separate TLV and named as "Node Latency", and this TLV is equal and parallel to the TE Link TLV defined by the RFC4203.

Specific formats of the "Link Latency" sub-TLV and "Node Latency" TLV can be identical as shown in Table 1. It contains the following latency parameters, which respectively represents the latency values of the links or the latency values of nodes:

1) Minimum latency value and minimum latency variation value.

2) Average latency value and average latency variation value.

3) Maximum latency value and maximum latency variation value.

TABLE 1

| 0 | | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| Type | | | | | | | | | | | | | | | | Length | | | | | | | | | | | | | | | |
| Minimum Latency Value | | | | | | | | | | | | | | | | Latency Variation Value | | | | | | | | | | | | | | | |
| Maximum Latency Value | | | | | | | | | | | | | | | | Latency Variation Value | | | | | | | | | | | | | | | |
| Average Layency Value | | | | | | | | | | | | | | | | Latency Variation Value | | | | | | | | | | | | | | | |

Preferably, a Record Route Object (RRO) also can be extended, a node ID (i.e. an IP Address) or an Interface Identifier defined by the RFC3477 is closely followed by a subobject, and a TLV format of the subobject is identical with the format of the Link Latency or the format of the Node Latency. After the Path message or the Resv message reaches one node, a Link Latency subobject and a Node Latency subobject are generated respectively according to latency parameter values of the node and the associated link latency parameter values, and are appended behind an interface identifier subobject and a node ID subobject. Meanwhile, a node initiating a connection establishment request can add the latency requirement in the direction from the source node to the sink node and the latency requirement in the direction from sink node to the source node into a Traffic Engineering Parameter TLV of the signaling message according to the user demands; after the sink node receives the Path message, according to the latency parameter values of all passed nodes and the latency parameter values of passed links between all adjacent nodes collected on the way in the RRO, the sink node calculates a total latency value in the direction from the source node to the sink node, and according to the latency requirement in the direction from the source node to the sink node required by the traffic engineering parameter, judges whether a collected total latency value satisfies the latency requirement, and if the collected total latency value does not satisfy the latency requirement, returns error information to the upstream, and the connection establishment is failed. With the same method, after the Resv message reaches the source node, according to the latency parameter values of all passed nodes and the latency parameter values of passed links between all adjacent nodes collected on the way in the RRO, the source node calculates a total latency value in the direction from the sink node to the source node, and according to the latency requirement in the direction from the sink node to the source node required by the traffic engineering parameter, judges whether a collected total latency value satisfies the latency requirement, and if the collected total latency value does not satisfy the latency requirement, returns connection establishment failure message to the user.

Example 2

The example provides a path computing apparatus, which can be placed on a management plane or a network management server and so on. The apparatus includes an acquisition module and a computation module.

The acquisition module is configured to: acquire a latency value of each node and a latency value of a link between each node and each adjacent node thereof.

In the example, the control plane release the latency value of a link between each node and each adjacent node thereof to the acquisition module through a routing protocol.

The computation module is configured to: when receiving a route computing request, according to each latency value acquired by the acquisition module, compute an end-to-end path satisfying a latency requirement of a service corresponding to the route computing request.

Wherein, the latency requirement of the service corresponding to the route computing request can be carried in the route computing request. The information of the latency requirement can include a latency required by the client; or it can include a minimum latency value, an average latency value, a maximum latency value and a selection policy of the latency requirement required by the client, wherein, the selection policy of the latency requirement is to make a prior selection to satisfy the minimum latency value, make a prior selection to satisfy the maximum latency value or make a prior selection to satisfy the average latency value; or the information of the latency requirement includes an acceptable maximum latency value and an acceptable maximum latency variation value required by the client, wherein, the selection policy of the latency requirement is to: satisfy only the acceptable maximum latency value; satisfy only the acceptable maximum latency variation value; satisfy the acceptable maximum latency variation value and the acceptable maximum latency value simultaneously; or need not to satisfy the acceptable maximum latency variation value and the acceptable maximum latency value.

Specifically, other implementation ways for the path computing apparatus may refer to the further descriptions of step 100 and step 200 in the example 1.

Wherein, the acquisition module is configured to acquire the latency value of the link between each node and each adjacent node thereof in the following way:

the acquisition module receiving the latency value of the link between each node and each adjacent node thereof reported by each node and released by the control plane to the path computing apparatus through the routing protocol, wherein, the latency value of the link between each node and each adjacent node thereof reported by each node is a latency value of a link between the node itself and each adjacent node thereof reported by each node to the control plane.

The acquisition module is configured to acquire the latency value of each node in the following way:

the acquisition module receiving the latency value of each node released by the control plane to the path computing apparatus through the routing protocol, wherein, the latency value of each node is reported to the control plane after each node acquires a latency value of the node itself.

Wherein, the latency value of each node is an average latency value of all services on the nodes, that is, the latency value of each node is an average value of all latency values from ingress interfaces to egress interfaces on nodes.

Example 3

The example provides a route control system, and the system is consisted of at least a node device and a path computing apparatus provided in the example 2. Wherein, the node device is configured to: determine a latency value of the node itself and a latency value of a link between the node itself and each adjacent node thereof; and the path computing apparatus is configured to: acquire a latency value of each node and a latency value of a link between each node and each adjacent node thereof from the each node device; and when receiving a route computing request, according to each latency value acquired, compute an end-to-end path satisfying a latency requirement of a service corresponding to the route computing request.

It can be seen that the node device has a latency measurement function;

wherein, the node device can perform latency measurement by means of actively measuring, such as the latency measurement is initiated automatically every 15 minutes or 24 hours. The latency measurement also can be performed according to a configured time interval such as 5 minutes or 1 hour. The latency measurement also can be performed according to a received indication.

In the example, after performing latency measurement, the node device reports latency measurement results to a control plane, and then the control plane releases the latency value of the link between each node and each adjacent node thereof to the path computing apparatus or a routing domain through a routing protocol.

Wherein, the path computing apparatus is configured to acquire the latency value of the link between each node and each adjacent node thereof in the following way:

the path computing apparatus receiving the latency value of the link between each node and each adjacent node thereof reported by each node and released by the control plane to the path computing apparatus through the routing protocol, wherein, the latency value of the link between each node and each adjacent node thereof reported by each node is a latency value of a link between the node itself and each adjacent node reported by each node to the control plane.

The path computing apparatus is configured to acquire the latency value of each node in the following way:

the path computing apparatus receiving the latency value of each node released by the control plane to the path computing apparatus through the routing protocol, wherein, the latency value of each node is reported to the control plane after each node acquires a latency value of the node itself.

Wherein, the latency value of each node is an average value of all latency values from ingress interfaces to egress interfaces on nodes.

Wherein, the control plane is configured to release the latency value of each node to the path computing apparatus through the routing protocol in the following way:

the control plane using the latency value reported by each node as attribute information of a traffic engineering link to release to the path computing apparatus.

In the preferred example, when the node device reports the latency measurement results to the control plane, it is to report only when the latency measurement results are different from the measurement historical data of the previous time, that is, when the latency of the link between the node and its adjacent node is changed, it is required to report the latency to the control plane again so as to release the latency to the routing domain or the path computing apparatus again through the routing protocol. Specifically, each node device measures the latency value of the link between the node itself and its adjacent node, when it is the first time for the node itself to perform latency measurement, it directly reports a measured latency value to the control plane, and when it is not the first time for the node itself to perform latency measurement, it judges whether a measured latency value of this time is identical with a measured latency value of last time, only when the measured latency value of this time is different from the measured latency value of last time and exceeds a threshold value set by a user, it reports the measured latency value of this time to the control plane.

Specifically, other implementation ways for the node device may refer to the further descriptions of step 100 in the example 1.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module. The present document is not limited to any combination of hardware and software in a specific form.

The above description is only the preferred examples of the present document, which is not used to limit the protection scope of the present document. All the modifications, equivalent substitutions, and improvements, etc. made within the spirit and principle of the present document shall fall into the protection scope of the present document.

INDUSTRIAL APPLICABILITY

In the examples of the present document, a routing control computed by the latency provides a solution for latency SLA of operators.

What is claimed is:

1. A route control method, comprising:
a path computing apparatus acquiring a latency value of each node and a latency value of a link between each node and each adjacent node thereof; and
when receiving a route computing request, according to each latency value acquired, the path computing apparatus computing an end-to-end path satisfying a latency requirement of a service corresponding to the route computing request;
wherein, the step of a path computing apparatus acquiring a latency value of a link between each node and each adjacent node thereof comprises:
a control plane receiving the latency value of the link between each node and each adjacent node thereof reported by each node, and releasing that latency value to the path computing apparatus or a routing domain through a routing protocol; wherein,
a step of each node reporting the latency value of the link between the node itself and each adjacent node thereof to the control plane comprises:
each node measuring the latency value of the link between the node itself and each adjacent node thereof, when it is a first time for the node itself to perform latency measurement, directly reporting the measured latency value to the control plane, and when it is not a first time for the node itself to perform latency measurement, judging whether the measured latency value of this time is identical with a measured latency value of last time, only when the measured latency value of this time is different from the measured latency value of last time and exceeds a threshold value set by a user, reporting the measured latency value of this time to the control plane.

2. The method according to claim 1, wherein, the step of a path computing apparatus acquiring a latency value of each node comprises:
each node acquiring a latency value of the node itself and reporting that latency value to a control plane, the control plane releasing the latency value of the node reported by each node to the path computing apparatus or the routing domain through a routing protocol; or
each node acquiring a latency value of the node itself and reporting that latency value to a control plane, the control plane accumulating ½ of the latency value of the node reported by each node to latency values of all links connected to the node respectively, and releasing the latency values of all the links to the path computing apparatus or the routing domain through a routing protocol.

3. The method according to claim 2, wherein, the latency value of each node is an average value of all latency values from ingress interfaces to egress interfaces on nodes.

4. The method according to claim 2, wherein, the step of the control plane releasing the latency value of the node reported by each node to the path computing apparatus or the routing domain through a routing protocol comprises:
the control plane taking the latency value reported by each node as attribute information of a traffic engineering link, and releasing the attribute information of the traffic engineering link to the path computing apparatus or the routing domain.

5. A route control method, comprising:
a path computing apparatus acquiring a latency value of each node and a latency value of a link between each node and each adjacent node thereof; and
when receiving a route computing request, according to each latency value acquired, the path computing apparatus computing an end-to-end path satisfying a latency requirement of a service corresponding to the route computing request;
the method further comprising:
after the path computing apparatus computes the end-to-end path satisfying the latency requirement of the service corresponding to the route computing request, a source node of the end-to-end path sending path message to a sink node of the end-to-end path, the sink node collecting latency values of all nodes passed by the path message and latency values of links between all adjacent nodes passed by the path message, and accumulating collected latency values to obtain a first total latency value, when determining that the first total latency value satisfies the latency requirement of the service corresponding to the route computing request, the sink node returning reservation message to an upstream node, and when determining that the first total latency value does not satisfy the latency requirement of the service corresponding to the route computing request, the sink node returning path error message to the upstream node.

6. The method according to claim 5, further comprising:
when the sink node returns the reservation message, the source node collecting latency values of all nodes passed by the reservation message and latency values of links between all adjacent nodes passed by the reservation message, and accumulating the collected latency values to obtain a second total latency value, and when determining that the second total latency value does not satisfy the latency requirement of the service corresponding to the route computing request, the source node indicating a connection establishment failure to a client.

7. The method according to claim 5, wherein, the latency values contain real-time latency values and latency variation values; and traffic engineering parameters of the path message and reservation message carry information of the latency requirement of the service corresponding to the route computing request; and
the information of the latency requirement comprises a latency required by a client; or
the information of the latency requirement comprises an acceptable maximum latency value and an acceptable maximum latency variation value required by a client, wherein, a selection policy of the latency requirement is to: satisfy only the acceptable maximum latency value; satisfy only the acceptable maximum latency variation value; satisfy the acceptable maximum latency variation value and the acceptable maximum latency value simultaneously; or need not to satisfy the acceptable maximum latency variation value and the acceptable maximum latency value.

8. The method according to claim 5, wherein,
in a step of accumulating the latency values of all nodes passed by the path message or the reservation message and the latency values of links between all adjacent nodes passed by the path message or the reservation message,
the path message and the reservation message carry a latency accumulation object, the latency accumulation object contains two subobjects, wherein a first subobject is used for accumulating latency values of all links and latency values of nodes in a direction from the source node to the sink node, and a second subobject is used for accumulating latency values of all links and latency values of nodes in a direction from the sink node to the source node.

9. The method according to claim 1, further comprising:
when the end-to-end path is required to cross at least one service layer network, in a signaling for establishing a Label Switching Path (LSP) in a top layer, in an subobject of a pair of border nodes when carrying parameter information for establishing a service layer Forwarding Adjacency LSP (FA-LSP), carrying a latency requirement of a service layer FA-LSP taking a pair of border nodes as a source node and a sink node; and the border nodes calculating a service layer FA-LSP route satisfying the latency requirement according to the latency requirement.

10. The method according to claim 9, further comprising:
when a total latency value of the entire FA-LSP of the service layer FA-LSP is changed, notifying a client layer using the FA-LSP of a changed total latency value.

11. The method according to claim 10, wherein, the step of notifying a client layer using the FA-LSP of a changed total latency value comprises: the source node of the FA-LSP or the sink node of the FA-LSP notifying a node of a client layer LSP connected to the source node of the FA-LSP or the sink node of the FA-LSP of the changed total latency value of the FA-LSP through signaling protocol message.

12. The method according to claim 10, further comprising:
if the FA-LSP forms an FA with a routing adjacency relation at the client layer, taking the changed total latency value of the FA-LSP as a value of a traffic engineering attribute of the FA, and releasing the value of the traffic engineering attribute of the FA to a routing domain or a path computing apparatus of the client layer.

13. A path computing apparatus, comprising:
an acquisition module, configured to: acquire a latency value of each node and a latency value of a link between each node and each adjacent node thereof; and
a computation module, configured to: when receiving a route computing request, according to each latency value acquired by the acquisition module, compute an end-to-end path satisfying a latency requirement of a service corresponding to the route computing request;
wherein, the acquisition module acquiring a latency value of a link between each node and each adjacent node thereof comprises:
a control plane receiving the latency value of the link between each node and each adjacent node thereof reported by each node, and releasing that latency value to the path computing apparatus or a routing domain through a routing protocol; wherein,
each node reporting the latency value of the link between the node itself and each adjacent node thereof to the control plane comprises:
each node measuring the latency value of the link between the node itself and each adjacent node thereof, when it is a first time for the node itself to perform latency measurement, directly reporting the measured latency value to the control plane, and when it is not a first time for the node itself to perform latency measurement, judging whether the measured latency value of this time is identical with a measured latency value of last time, only when the measured latency value of this time is different from the measured latency value of last time and exceeds a threshold value set by a user, reporting the measured latency value of this time to the control plane.

14. The method according to claim 1, wherein, the step of a path computing apparatus acquiring a latency value of each node comprises:
each node acquiring a latency value of the node itself and reporting that latency value to a control plane, the control plane releasing the latency value of the node reported by each node to the path computing apparatus or the routing domain through a routing protocol; or
each node acquiring a latency value of the node itself and reporting that latency value to a control plane, the control plane accumulating ½ of the latency value of the node reported by each node to latency values of all links connected to the node respectively, and releasing the latency values of all the links to the path computing apparatus or the routing domain through a routing protocol.

15. The method according to claim 6, wherein, the latency values contain real-time latency values and latency variation values; and traffic engineering parameters of the path message and reservation message carry information of the latency requirement of the service corresponding to the route computing request; and the information of the latency requirement comprises a latency required by a client; or the information of the latency requirement comprises an acceptable maximum latency value and an acceptable maximum latency variation value required by a client, wherein, a selection policy of the latency requirement is to: satisfy only the acceptable maximum latency value; satisfy only the acceptable maximum latency variation value; satisfy the acceptable maximum latency variation value and the acceptable maximum latency value simultaneously; or need not to satisfy the acceptable maximum latency variation value and the acceptable maximum latency value.

16. The method according to claim 5, further comprising: when the end-to-end path is required to cross at least one service layer network, in a signaling for establishing a Label Switching Path (LSP) in a top layer, in an subobject of a pair of border nodes when carrying parameter information for establishing a service layer Forwarding Adjacency LSP (FA-LSP), carrying a latency requirement of a service layer FA-LSP taking a pair of border nodes as a source node and a sink node; and the border nodes calculating a service layer FA-LSP route satisfying the latency requirement according to the latency requirement.

17. The method according to claim 16, further comprising: when a total latency value of the entire FA-LSP of the service layer FA-LSP is changed, notifying a client layer using the FA-LSP of a changed total latency value.

18. The method according to claim 17, wherein, the step of notifying a client layer using the FA-LSP of a changed total latency value comprises: the source node of the FA-LSP or the sink node of the FA-LSP notifying a node of a client layer LSP connected to the source node of the FA-LSP or the sink node of the FA-LSP of the changed total latency value of the FA-LSP through signaling protocol message.

19. The method according to claim 17, further comprising: if the FA-LSP forms an FA with a routing adjacency relation at the client layer, taking the changed total latency value of the FA-LSP as a value of a traffic engineering attribute of the FA, and releasing the value of the traffic engineering attribute of the FA to a routing domain or a path computing apparatus of the client layer.

* * * * *